(12) United States Patent
Brown et al.

(10) Patent No.: US 7,917,521 B2
(45) Date of Patent: Mar. 29, 2011

(54) USER/BROWSER STATE INFORMATION SHARING BETWEEN BROWSER APPLICATIONS

(75) Inventors: Deanna Lynn Quigg Brown, Queen Creek, AZ (US); Dinesh Chandra Coca, San Francisco, CA (US); Melissa Jorgette Garcia, Tucson, AZ (US); Andrew Gary Hourselt, Tucson, AZ (US); Elena Schneider, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 12/045,521

(22) Filed: Mar. 10, 2008

(65) Prior Publication Data

US 2009/0228504 A1 Sep. 10, 2009

(51) Int. Cl.
*G06F 17/30* (2006.01)
(52) U.S. Cl. .............. 707/751; 707/796; 707/E17.006
(58) Field of Classification Search ........... 707/999.101, 707/101, E17.006, 999.001, 804, 796, 751
See application file for complete search history.

(56) References Cited

U.S. PATENT DOCUMENTS

| | | | |
|---|---|---|---|
| 6,208,991 B1 | 3/2001 | French et al. | |
| 7,039,946 B1 | 5/2006 | Binding et al. | |
| 2003/0046290 A1 | 3/2003 | Yamada | |
| 2003/0105819 A1 | 6/2003 | Kim et al. | |
| 2004/0225629 A1* | 11/2004 | Eder | 706/46 |
| 2004/0237045 A1 | 11/2004 | Meltzer | |
| 2005/0210145 A1 | 9/2005 | Kim et al. | |
| 2006/0031077 A1 | 2/2006 | Dalton et al. | |
| 2006/0235953 A1 | 10/2006 | Meier | |
| 2007/0033517 A1* | 2/2007 | O'Shaughnessy et al. | 715/501.1 |
| 2007/0061371 A1* | 3/2007 | Bodin et al. | 707/200 |
| 2007/0192684 A1* | 8/2007 | Bodin et al. | 715/513 |
| 2008/0046471 A1* | 2/2008 | Moore et al. | 707/104.1 |
| 2008/0297829 A1* | 12/2008 | Paek | 358/1.15 |

\* cited by examiner

*Primary Examiner* — Leslie Wong
*Assistant Examiner* — Shiow-Jy Fan
(74) *Attorney, Agent, or Firm* — Janaki K. Davda; Konrad Raynes & Victor LLP (57) ABSTRACT

Provided are techniques for state information sharing. At least one of user information and browser information is stored in a first configuration file in a first file format associated with a first browser application. A change in at least one of the user information and the browser information in the first configuration file is recognized. The changed at least one of the user information and the browser information in the first file format is converted to a second file format associated with a second browser application. A second configuration file is updated with the changed at least one of the user information and the browser information in the second file format. In response to starting the second browser application, a user and browser state is set using the user information and the browser information in the second configuration file.

15 Claims, 6 Drawing Sheets

USER/BROWSER STATE INFORMATION SHARING BETWEEN BROWSER APPLICATIONS

BACKGROUND

1. Field

Embodiments of the invention relate to user/browser state information sharing between browser applications.

2. Description of the Related Art

The World Wide Web (WWW or "Web") may be described as provided access to a large set of documents (web pages), and each document may be linked to one or more other documents via hypertext links in the document. A browser application (e.g., a web browser application) may be described as a tool that enables a user to view web pages. A web page may contain text, images, videos, and/or other multimedia, in addition to hyperlinks.

A common problem with browser applications today is that user/browser state information (e.g., bookmarks and user preferences) are saved on per-browser basis. Individual browser applications, such as Internet Explorer® browser (Explorer is a trademark of Microsoft Corporation in the United States, other countries, or both) and Mozilla® Firefox® browser (Mozilla and Firefox are trademarks of Mozilla Foundation in the United States, other countries, or both), store information such as user bookmarks in their own proprietary format, and no synchronization is done between different browser applications. Thus, a user has to configure the same settings and bookmarks multiple times in different browser applications.

Thus, there is a need in the art for user/browser state information sharing between browser applications.

SUMMARY OF EMBODIMENTS OF THE INVENTION

Provided are a method, computer program product, and system for state information sharing. At least one of user information and browser information is stored in a first configuration file in a first file format associated with a first browser application. A change in at least one of the user information and the browser information in the first configuration file is recognized. The changed at least one of the user information and the browser information in the first file format is converted to a second file format associated with a second browser application. A second configuration file is updated with the changed at least one of the user information and the browser information in the second file format. In response to starting the second browser application, a user and browser state is set using the user information and the browser information in the second configuration file.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments track user/browser state information that is saved by various browser applications for the purposes of synchronizing this information between browser applications. User/browser state information includes user state information and/or browser state information. For example, user/browser state information includes bookmarks (e.g., web sites selected by a user to be added to a list of "favorite" sites), user preferences, browser settings, browser cookies, home page settings, authentication information, session data (e.g., adding an item to a shopping cart on a e-commerce web site), etc.

Embodiments allow a user to configure user/browser state information a single time, after which embodiments automatically perform synchronization to propagate changes to configuration files of other browser applications.

Figure 1:
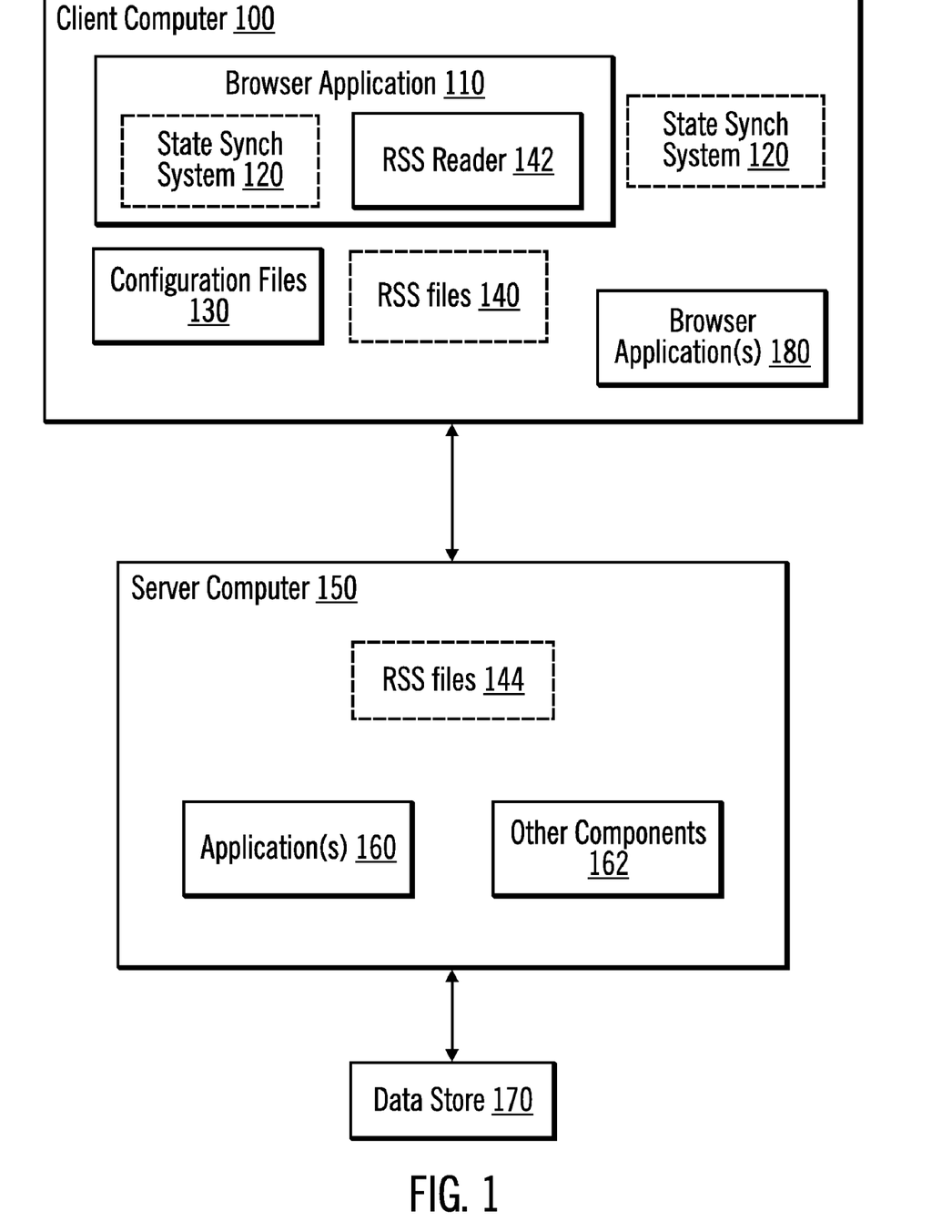
FIG. 1 illustrates details of a computing environment in accordance with certain embodiments.

FIG. 1 illustrates details of a computing environment in accordance with certain embodiments. A client computer 100 is coupled to a server computer 150 (e.g., via a network). The client computer 100 includes a browser application 110 and one or more other browser applications 180. In certain embodiments, a state synch system 120 is part of the browser application 110, 180. In certain alternative embodiments, the state synch system 120 is separate from the browser application 110, 180. The client computer 100 also includes configuration files 130. In certain embodiments, there is one configuration file 130 for each user and for each browser application 110 (e.g., User1 has configuration file-A for Browser1 and configuration file-B for Browser 2). In certain alternative embodiments, each configuration file 130 is associated with a group of users or an entity (e.g., Human Resources or Accounting).

In certain embodiments, the browser application 110, 180 includes a Really Simple Syndication (RSS) reader 142 and the client computer 100 includes RSS files 140. In certain embodiments, there is one RSS file for each user and for each browser application 110, 180 (e.g., User1 has RSS file-A for Browser1 and RSS file-B for Browser 2). In certain alternative embodiments, each RSS file 140 is associated with a group of users or an entity (e.g., Human Resources or Accounting). In certain embodiments, an RSS feed or RSS file 140, 144 is directly applicable to existing browser applications for bookmark sharing without any extra software (i.e., no synch software). Also, in certain embodiments, with added synch software, the RSS feed or RSS file 140, 144 may be used to transmit information about any browser settings, etc., in addition to bookmarks, by containing the data within, for example, the RSS headlines.

RSS may be described as a delivery mechanism in which users subscribe to content (e.g., news headlines) via browser applications (e.g., browser application 110). RSS may be described as a lightweight eXtensible Markup Language (XML) format designed for sharing content. There are various specifications and standards that further define RSS. Each RSS file contains a list of items. Each item has, for example, a title, a summary, and a link to a Uniform Resource Locator (URL). When an RSS file is updated, browser applications 110 that subscribe to the RSS feed associated with that RSS file 140, 144 are updated as well.

An RSS reader 142 may be described as storing RSS URLs selected by the user and as having an agent that periodically checks those URLs to see if they have been updated. If the RSS reader 142 determines the RSS feeds have been updated since the last check, the RSS reader 142 alerts the user and may grab copies of the RSS feeds to be stored locally in the browser application 110 cache. The RSS reader 142 may also include a Graphical User Interface (GUI) in the browser application 110 that has a tree view of a user's RSS URLs, a pane showing the list of titles, and a pane displaying the contents of a title when a user selects that title (e.g., by using a mouse to point and click on the title). Subscription is selected by the user adding an RSS feed URL to an RSS reader 142. The RSS reader 142 may be installed in the browser application 110 by the user or may be part of the browser application 110 functionality.

Although not shown, the browser applications 180, like browser application 110, may each include the state synch system 120 and/or the RSS reader 142.

The server computer 150 includes RSS files 144 in certain embodiments. The server computer 140 may also include applications 160 and one or more other components 162. The server computer 150 is coupled to a data store 170.

The client computer 100 and server computer 150 may comprise any computing device known in the art, such as a server, mainframe, workstation, personal computer, hand held computer, laptop telephony device, network appliance, etc.

The network coupling the client computer 100 and server computer 150 may comprise any type of network, such as, for example, a peer-to-peer network, spoke and hub network, Storage Area Network (SAN), a Local Area Network (LAN), Wide Area Network (WAN), the Internet, an Intranet, etc.

The data store 170 may comprise an array of storage devices, such as Direct Access Storage Devices (DASDs), Just a Bunch of Disks (JBOD), Redundant Array of Independent Disks (RAID), virtualization device, etc.

Figure 2:
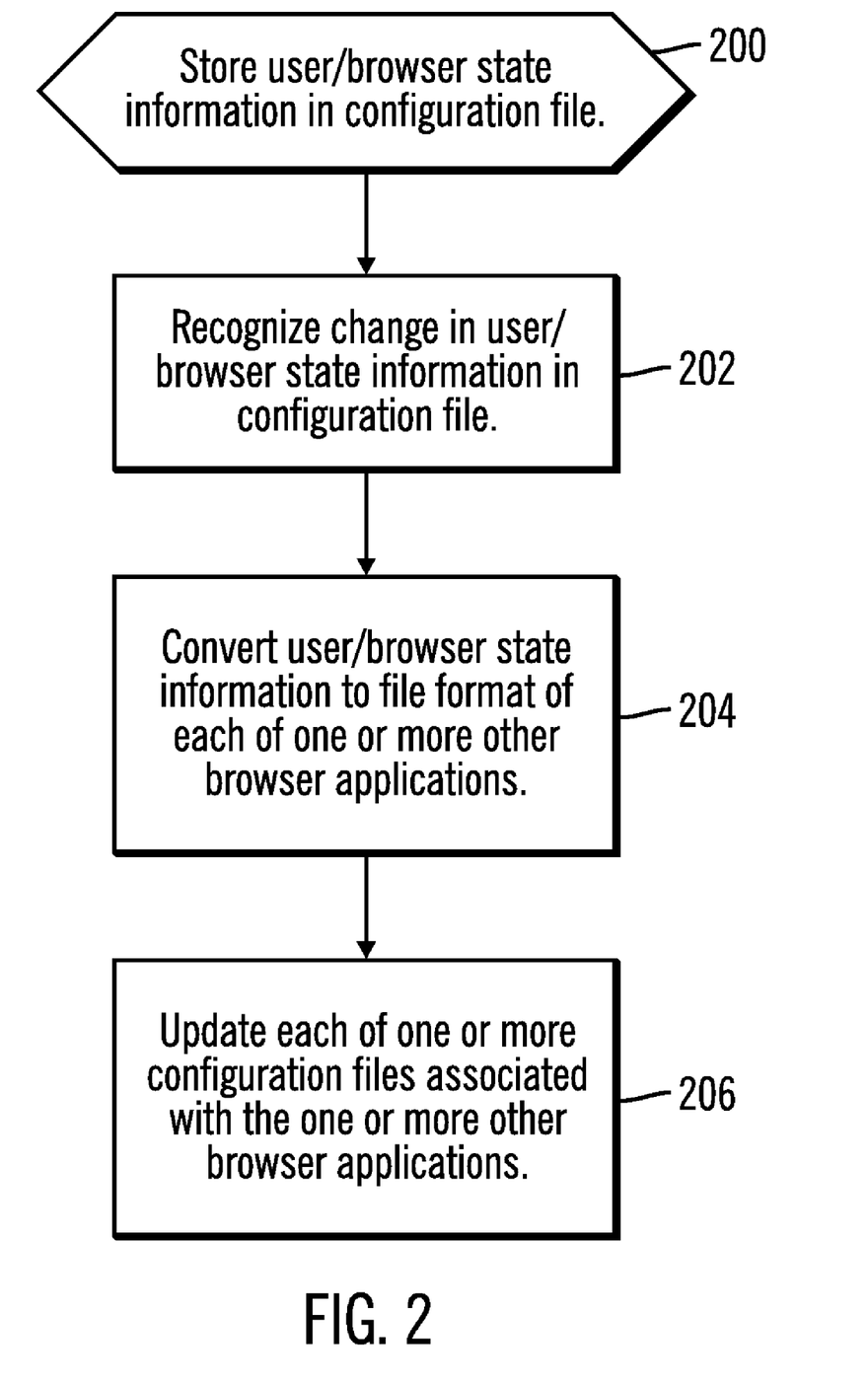
FIG. 2 illustrates logic performed by a state synch system in accordance with certain embodiments.

FIG. 2 illustrates logic performed by the state synch system 120 in accordance with certain embodiments. Control begins at block 200 with the browser application 110 storing user/browser state information in a configuration file 130. In certain embodiments, the browser application 110 saves the user/browser information state in one or more configuration files 130 (e.g., at a specific location on a user's hard drive). The file format in which the configuration files 130 are saved may be similar between browser application types or may be completely different. The state synch system 120 is capable of reading file formats of configuration files 130 for different browser applications 110, 180 and understanding the content within the configuration files 130, thereby allowing the state synch system 120 to synchronize any changes from one configuration file 130 to the other configuration files.

In block 202, the state synch system 120 recognizes that there is a change in the user/browser state information in the configuration file 130. In block 204, the state synch system 120 converts the user/browser state information to a file format of each of one or more other browser applications 180. In certain embodiments, a user is able to indicate which of the browser applications 110, 180 are to be kept in synch (i.e., automatically updated with changes from other browser applications 110, 180). In certain embodiments, all browser applications 110, 180 are kept in sync. In block 206, the state synch system 120 updates each of the one or more configuration files 130 associated with the one or more other browser applications 180.

Figure 3:
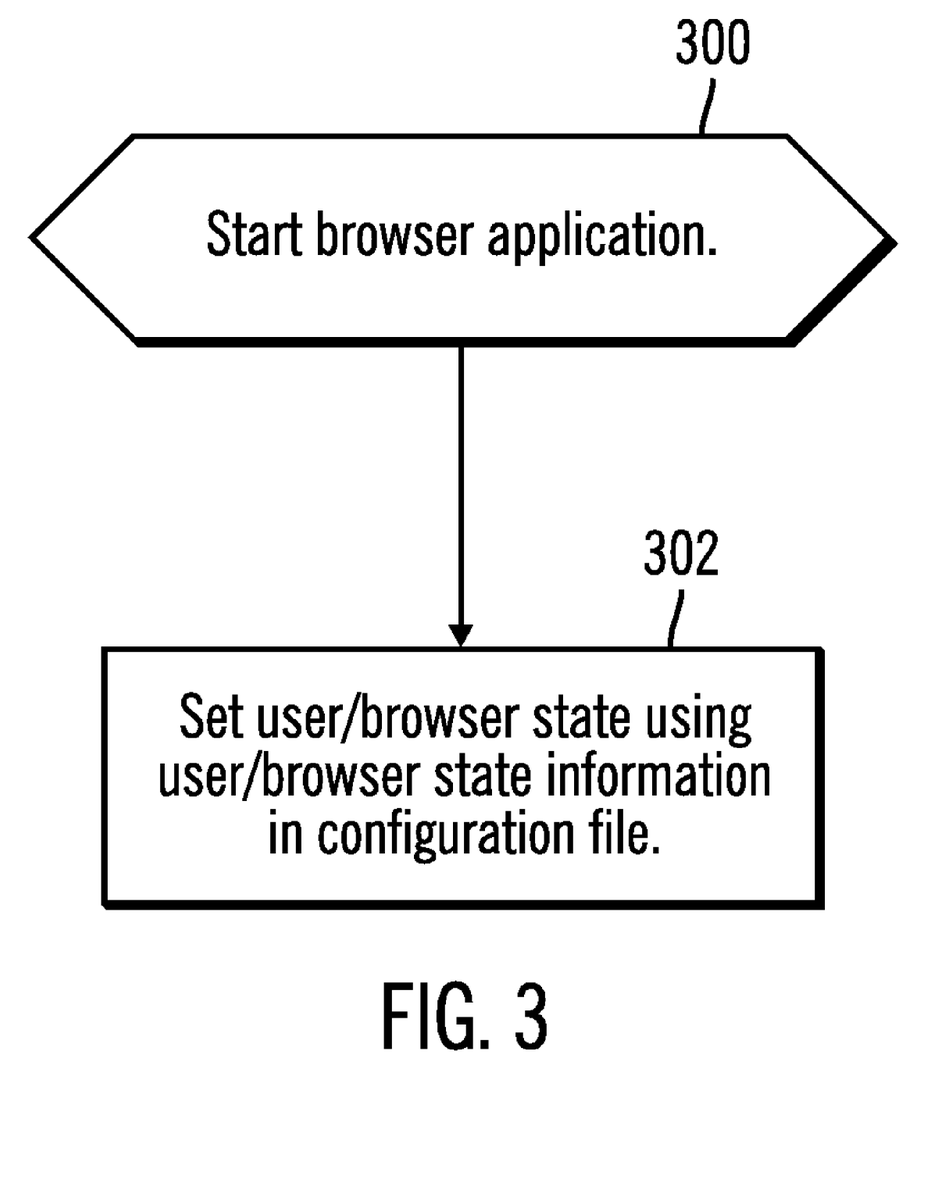
FIG. 3 illustrates logic performed using a configuration file when a browser application is started in accordance with certain embodiments.

FIG. 3 illustrates logic performed using a configuration file 130 when a browser application 110, 180 is started in accordance with certain embodiments. Control begins at block 300 with the browser application 110, 180 being started. In block 302, the browser application 110, 180 sets the user/browser state using the user/browser state information in a configuration file 130. Thus, if the configuration file 130 is updated for a particular browser application 110, 180, when that browser application 110, 180 starts, the user/browser state information is updated (e.g., bookmarks added in one browser application 110 are automatically shown as added in another browser application 180).

A comparison of stored bookmark information between an Internet Explorer® browser and a Mozilla® Firefox® browser will be provided merely to enhance understanding of embodiments.

The following is an example Internet Explorer® browser bookmark format:
Internet Explorer
Bookmark save location: C:\Documents and Settings\<Username>\Favorites
Bookmark file format: Internet Shortcuts organized as a directory structure The Internet Explore® browser saves bookmark data as Internet Shortcuts, organized in a directory structure that is dependent on how the bookmarks are created. When creating a bookmark within the Internet Explore® browser, users are given the option to place new bookmarks within the top level list or to create categories within which they can place bookmarks. The Internet Explorer® browser handles this by creating a base directory on the user's file system known as "Favorites," within which all top level bookmarks are placed, as well as subdirectories for the various categories that a user defines. Bookmarks placed within these categories are saved as Internet Shortcuts within the subdirectories under Favorites.

The following is an example Mozilla® Firefox® browser bookmark format:
Mozilla Firefox
Bookmark save location: C:\Documents and Settings\<Username>\Application Data\Mozilla\Firefox\Profiles\<profile name>
Bookmark file format: Single HTML file to store all bookmarks The Mozilla® Firefox® browser allows users to create bookmarks and add them to either a top level list or a specific category. In the case of the Mozilla® Firefox® browser, all bookmarks and categories are saved within a single HTML file. The bookmark structure is preserved through use of HTML code to group together bookmarks within the same category.

The state synch system 120 understands both types of bookmark file formats used by the Internet Explorer® and the Mozilla® Firefox® browser applications, as well as the file formats of other browser applications. Thus, if a user creates a new bookmark within the Internet Explorer browser, the state synch system 120 sees an addition to the directory structure under C:\Documents and Settings\<Username>\Favorites, and the state synch system 120 proceeds to make an update to the Mozilla® Firefox® browser single HTML bookmark file to include the newly added bookmark. Similarly, the state synch system 120 performs the same type of propagation to other bookmark files from other browser applications 110, 180.

RSS files 140, 144 include Hypertext Markup Language (HTML) or other markup language data. Since some browser applications 110 use HTML or other markup languages to import user/browser state information (e.g., live bookmarks via RSS feeds), embodiments support RSS files 140, 144 to enable synchronizing user/browser state information. For example, embodiments support markup-based live bookmarks for sharing bookmarks and other browser application 110, 180 customization information.

Figure 4:
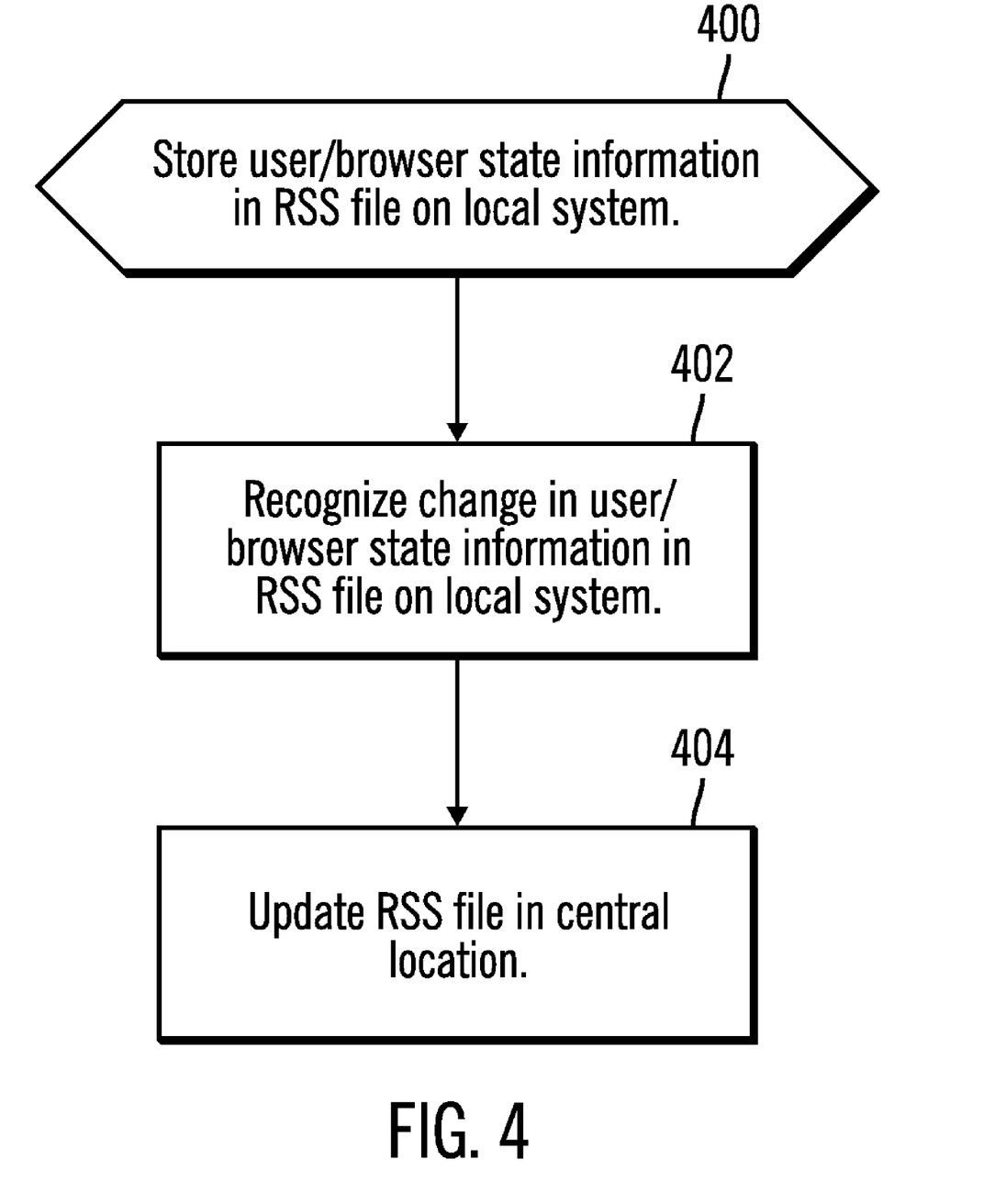
FIG. 4 illustrates logic performed by a Really Simple Syndication (RSS) reader in accordance with certain embodiments.

FIG. 4 illustrates logic performed by the RSS reader 142 in accordance with certain embodiments. Control begins at block 400 with either the browser application 110, 180 or the state synch system 120 storing user/browser state information in an RSS file 140 on the local system (e.g., client computer 100). For example, when putting non-bookmark information into the RSS file, the state synch system 120 may also store/read user information in the RSS file. In block 402, the state synch system 120 recognizes that there is a change in the user/browser state information in the RSS file 140. In block 404, the state synch system 120 updates the RSS file 144 on the central system (e.g., on server computer 150). To update RSS file 144, the state synch system 120 may send updates to the server computer 150.

Storing the RSS file 144 on the central system enables user to share browser settings across machines (e.g., a user may switch computers and have the same website settings active, such as user login).

Figure 5:
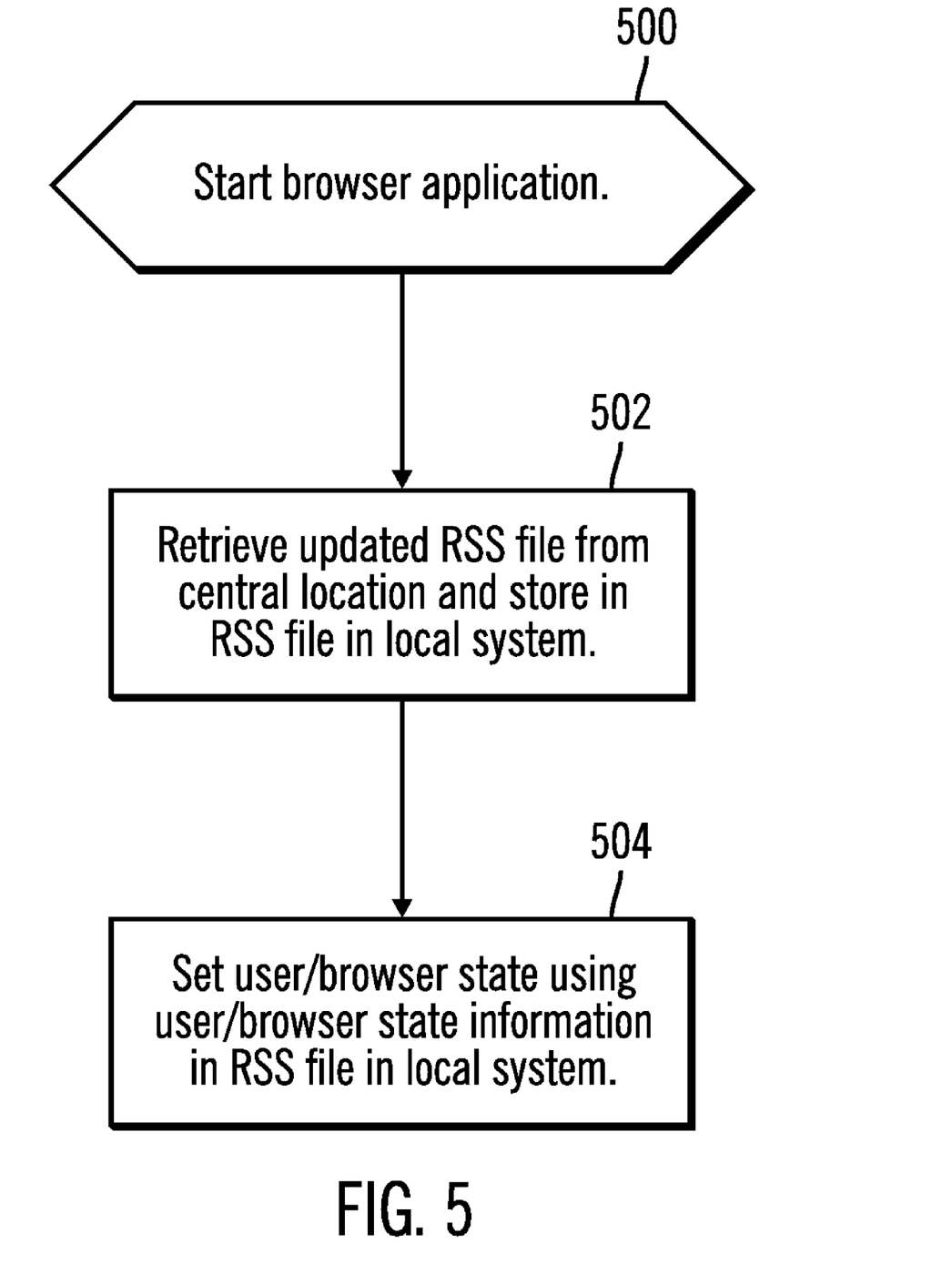
FIG. 5 illustrates logic performed using an RSS file when a browser application is started in accordance with certain embodiments.

FIG. 5 illustrates logic performed using an RSS file 140 when a browser application 110, 180 is started in accordance with certain embodiments. Control begins at block 500 with a browser application 110, 180 starting. In block 502, the RSS reader 142 retrieves an updated RSS file 144 from a central location and stores the data in the RSS file 140 in the local system. In block 504, the browser application 110, 180 sets the user/browser state using the user/browser state information in the RSS file 140 in the local system. For bookmarks, existing unmodified browser applications may immediately pick up bookmark information from the RSS file 140. For additional data, such as browser settings or session data, the state synch system 120 reads the settings from the RSS file 140 and stores them in the browser's settings format and location.

In certain embodiments, RSS files 140, 144 are used if a browser application 110, 180 does not use configuration files 130. With RSS files 140, embodiments store user/browser state information (e.g., bookmarks) in an RSS feed in a location on the client computer 100 (i.e., local system). In certain embodiments, HTML may be contained in the RSS feed (e.g., settings data and links can be stored). In certain embodiments, an HTML feed is used in addition to the RSS feed, and the HTML feed is capable of storing and retrieving the user/browser state information as described with reference to the RSS feed. Then, the RSS reader 142 links to the RSS file 144 updated by embodiments. In certain embodiments, the state synch system 120 maintains the updates to the RSS files 144. In this manner, bookmarks from other browser applications 110, 180 are synchronized to the RSS file 144 so that the browser applications 110, 180 can each show the common set of links in a live bookmark. In particular, for reading, the browser application 110 directly reads bookmark data. However, the browser application 110 relies on the state synch system 120 to write new bookmark data to the central location/common RSS file 144 and to read/write non-bookmark settings to the RSS file 140, 144.

With embodiments, as new browser applications with new file formats are created, the state synch system 120 is capable of being updated to convert between existing file formats and the new file formats.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2-5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2-5 may be implemented in software, hardware, programmable and non-programmable gate array logic or in some combination of hardware, software, or gate array logic.

Figure 6:
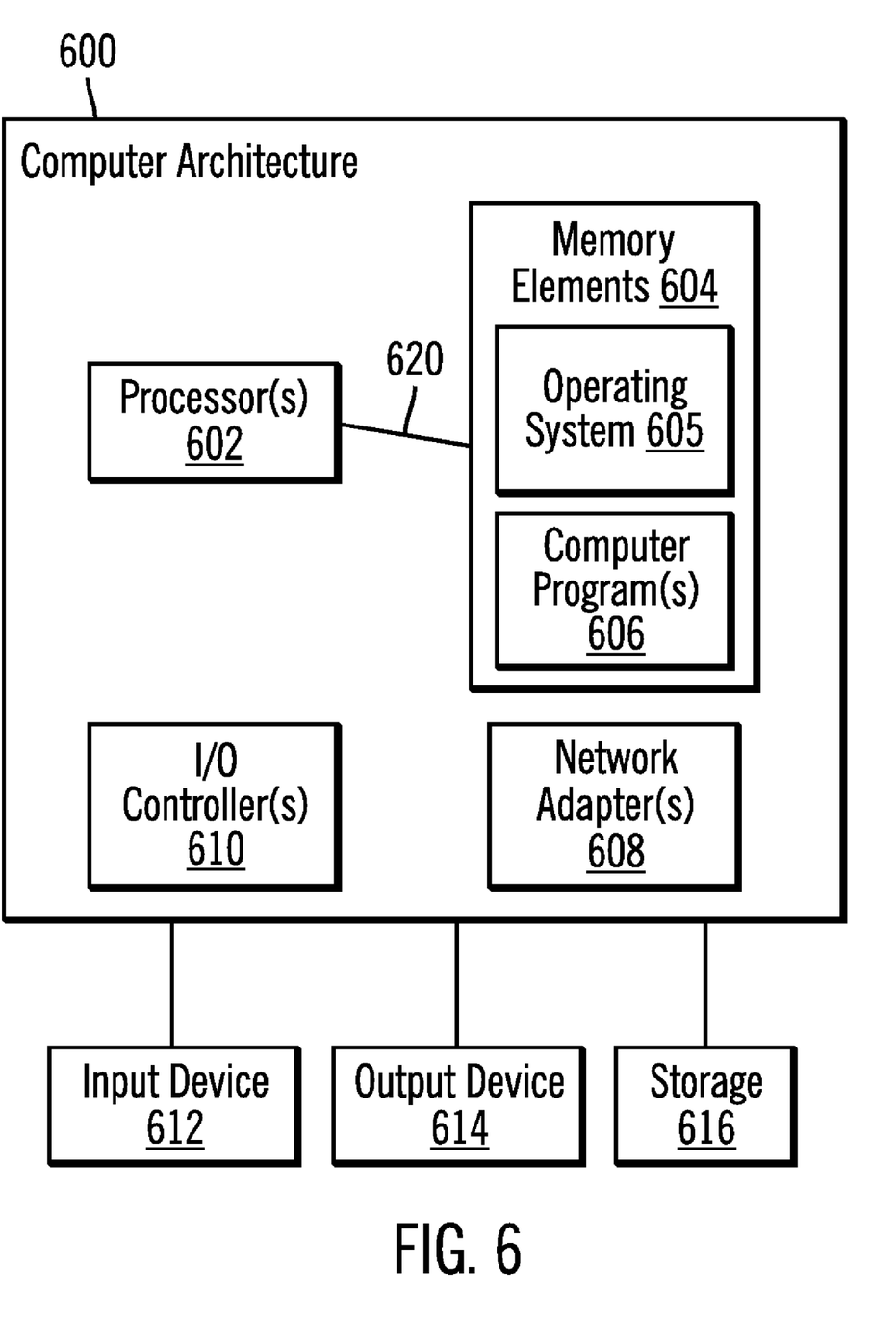
FIG. 6 illustrates a system architecture that may be used in accordance with certain embodiments.

FIG. 6 illustrates a system architecture 600 that may be used in accordance with certain embodiments. Client computer 100 and/or server computer 150 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
   storing at least one of user information and browser information in a first configuration file in a first file format associated with a first browser application;
   storing at least one of user information and browser information in a second configuration file in a second file format associated with a second browser application, wherein the first browser application and the second browser application are different browser applications;
   recognizing a change in at least one of the user information and the browser information in the first configuration file;
   in response to recognizing the change, synchronizing the first configuration file for the first browser application with the second configuration file for the second browser application by:
      converting the changed at least one of the user information and the browser information in the first file format to the second file format associated with the second browser application; and
      updating the second configuration file with the changed at least one of the user information and the browser information in the second file format; and
   in response to starting the second browser application, setting a user and browser state using the user information and the browser information in the second configuration file.

2. The computer-implemented method of claim 1, further comprising:
   storing at least one of the user information and the browser information in a Really Simple Syndication (RSS) file in a local system.

3. The computer-implemented method of claim 2, further comprising:
   recognizing a change in at least one of the user information and the browser information in the first configuration file; and
   updating an RSS file on a central system.

4. The computer-implemented method of claim 2, further comprising:
   in response to starting a third browser application,
      retrieving the updated RSS file on the central system; and
      setting the user information and the browser information using the retrieved RSS file.

5. The computer-implemented method of claim 1, wherein the user information and the browser information include bookmarks, user preferences, browser settings, browser cookies, home page settings, authentication information, and session data.

6. A computer program product comprising a computer readable medium including a computer readable program, wherein the computer readable medium is a member of a set of computer readable media consisting of a semiconductor or solid state memory, magnetic tape, a removable computer diskette, a rigid magnetic disk, an optical disk, a magnetic storage medium, volatile and non-volatile memory devices, wherein the computer readable program when executed on a computer causes the computer to:

store at least one of user information and browser information in a first configuration file in a first file format associated with a first browser application;

store at least one of user information and browser information in a second configuration file in a second file format associated with a second browser application, wherein the first browser application and the second browser application are different browser applications;

recognize a change in at least one of the user information and the browser information in the first configuration file;

in response to recognizing the change, synchronize the first configuration file for the first browser application with the second configuration file for the second browser application by:

converting the changed at least one of the user information and the browser information in the first file format to the second file format associated with the second browser application; and         updating the second configuration file with the changed at least one of the user information and the browser information in the second file format; and     in response to starting the second browser application, setting a user and browser state using the user information and the browser information in the second configuration file.

7. The computer program product of claim 6, further comprising:

storing at least one of the user information and the browser information in a Really Simple Syndication (RSS) file in a local system.

8. The computer program product of claim 7, further comprising:

recognizing a change in at least one of the user information and the browser information in the first configuration file; and     updating an RSS file on a central system.

9. The computer program product of claim 7, further comprising:

in response to starting a third browser application, retrieving the updated RSS file on the central system; and         setting the user information and the browser information using the retrieved RSS file.

10. The computer program product of claim 6, wherein the user information and the browser information include bookmarks, user preferences, browser settings, browser cookies, home page settings, authentication information, and session data.

11. A system, comprising:
a processor; and
hardware logic performing operations, the operations comprising:

storing at least one of user information and browser information in a first configuration file in a first file format associated with a first browser application;

storing at least one of user information and browser information in a second configuration file in a second file format associated with a second browser application, wherein the first browser application and the second browser application are different browser applications;

recognizing a change in at least one of the user information and the browser information in the first configuration file;

in response to recognizing the change, synchronizing the first configuration file for the first browser application with the second configuration file for the second browser application by:

converting the changed at least one of the user information and the browser information in the first file format to the second file format associated with the second browser application; and         updating the second configuration file with the changed at least one of the user information and the browser information in the second file format; and     in response to starting the second browser application, setting a user and browser state using the user information and the browser information in the second configuration file.

12. The system of claim 11, further comprising:
storing at least one of the user information and the browser information in a Really Simple Syndication (RSS) file in a local system.

13. The system of claim 12, further comprising:
recognizing a change in at least one of the user information and the browser information in the first configuration file; and
updating an RSS file on a central system.

14. The system of claim 12, further comprising:
in response to starting a third browser application,
    retrieving the updated RSS file on the central system; and
    setting the user information and the browser information using the retrieved RSS file.

15. The system of claim 11, wherein the user information and the browser information include bookmarks, user preferences, browser settings, browser cookies, home page settings, authentication information, and session data.

\* \* \* \* \*